(12) United States Patent
Park et al.

(10) Patent No.: US 7,301,994 B2
(45) Date of Patent: Nov. 27, 2007

(54) MODULATION APPARATUS FOR REDUCING TIME DELAY OF ON-CHANNEL REPEATER IN TERRESTRIAL DIGITAL TV BROADCASTING SYSTEM

(75) Inventors: Sung-Ik Park, Daejon (KR); Yong-Tae Lee, Daejon (KR); Jae-Hyun Seo, Daejon (KR); Seung-Won Kim, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 665 days.

(21) Appl. No.: 10/839,315

(22) Filed: May 4, 2004

(65) Prior Publication Data
US 2005/0094717 A1 May 5, 2005

(30) Foreign Application Priority Data
Oct. 29, 2003 (KR) ........................ 10-2003-0076097

(51) Int. Cl.
*H04B 3/36* (2006.01)
(52) U.S. Cl. .................................... 375/211
(58) Field of Classification Search ............... 375/211, 375/219, 295, 296, 370; 708/300, 322
See application file for complete search history.

(56) References Cited

U.S. PATENT DOCUMENTS 5,737,361 A * 4/1998 Park et al. .................. 375/149
5,930,299 A  7/1999 Vannatta et al.
6,128,539 A * 10/2000 Markandey et al. .......... 700/29
6,603,804 B1 * 8/2003 Khoini-Poorfard et al. . 375/152
6,618,443 B1 * 9/2003 Kim et al. ............. 375/240.21

OTHER PUBLICATIONS

"On-Channel Repeater for Digital Television Boradcasting Service", IEEE Transactions on Broadcasting, vol. 48, No. 2, Jun. 2002, pp. 97-102.

* cited by examiner

*Primary Examiner*—Khanh C. Tran
(74) *Attorney, Agent, or Firm*—Blakely, Sokoloff, Taylor & Zafman

(57) ABSTRACT

Provided is a modulation apparatus that can reduce time delay of on-channel repeaters in a terrestrial digital television broadcasting system. The time delay is caused by a filter during the modulation operation in the on-channel repeaters. The modulation apparatus of the present research includes: a baseband signal forming unit for forming a baseband signal by combining the output signals of an equalization unit with the pre-defined field/segment synchronization signals in the on-channel repeaters; a pilot inserting unit for inserting a pilot signal to the baseband signal; an up-sampling unit for up-sampling the baseband signal with the pilot signal; a VSB filtering unit for filtering the up-sampled baseband signal based on a Window technique and/or an Equi-Ripple filter to thereby form an in-phase (I) signal and a quadrature (Q) signal; an up-converting unit for up-converting the frequencies of the filtered I and Q signals to frequencies of an intermediate frequency (IF) band; an adding unit for adding the up-converted I and Q signals and converting a resultant signal into a digital VSB signal of the IF band; and a digital-to-analogue converting unit for converting the digital signal of the IF band to an analogue signal.

1 Claim, 4 Drawing Sheets

MODULATION APPARATUS FOR REDUCING TIME DELAY OF ON-CHANNEL REPEATER IN TERRESTRIAL DIGITAL TV BROADCASTING SYSTEM

FIELD OF THE INVENTION

The present invention relates to a digital television (TV) broadcasting service technology; and, more particularly, to a modulation apparatus that can reduce time delay of an on-channel repeater (OCR) in a terrestrial digital TV broadcasting system and a method thereof.

DESCRIPTION OF RELATED ART

Generally, main transmitters and repeaters are placed for broadcasting services according to broadcasting coverage of a broadcasting station and according to natural topography and configuration of the ground.

The repeaters are set up in regions where broadcasting signals of the main transmitters are weakly received to solve the problem of poor broadcasting signal reception and widen the transmission coverage of the broadcasting signals from the main transmitters.

The repeaters that are used for the current terrestrial digital broadcasting service receive broadcasting signals from the main transmitters and transmit the received broadcasting signals through different frequencies that are allocated to different repeaters.

Referring to FIG. 1, conventionally, a main transmitter 11 transmits a broadcasting signal through a transmission frequency A, and repeaters 12 to 15 relay the broadcasting signals from the transmission frequency A to another frequencies B, C, D, and E. That is, in the terrestrial digital television (TV) broadcasting service of FIG. 1, each of the repeaters 12 to 15 is given a different frequency B, C, D or E to solve the problem of weak broadcasting signal reception in the region out of the broadcasting service coverage or to expand the broadcasting service coverage.

However, to use a different frequency B, C, D or E for each repeater 12, 13, 14 or 15 in the terrestrial digital TV broadcasting service, a plurality of frequency bands are needed for the repeaters 12 to 15. That is, many frequency resources are needed. This is quite inefficient in the respect of frequency usage, because the same frequency cannot be re-used in the remote area but it can be used in a far region where no interference between the same frequencies is generated.

If the repeaters 12 to 15 could use the frequency A which is the frequency used in the main transmitter 11, the same frequency could be re-used in the adjacent area, thus increasing the frequency use efficiency remarkably.

FIG. 2 shows a main transmitter 21 transmitting a broadcasting signal through a frequency A and on-channel repeaters (OCR) 22 to 25 relaying the broadcasting signal through the same frequency A. In this embodiment, the frequency use efficiency becomes very high. For this, a receiver should be able to discriminate broadcasting signals transmitted from the main transmitter 21 and the on-channel repeaters 22 to 15 that use the same frequency band.

Since ordinary receivers are equipped with an equalizing portion for removing multi-path signals, it is possible to remove time-delayed signals, other than desired signals in the same frequency band.

However, as shown in FIG. 2, in case where broadcasting signals are relayed using the on-channel repeaters 22 to 25 through the same frequency band A, interference may be generated between the same channels and the time-delayed multi-path signals cannot be removed in the equalization unit of a receiver.

If the signals transmitted from the main transmitter 21 and the on-channel repeaters 22 to 25 have a time delay that goes out of the multi-path signal removal capability of the equalizing portion in the receiver, the equalizing portion cannot remove the time-delayed signals.

Therefore, to provide the terrestrial digital TV broadcasting service through the on-channel repeaters 22 to 25, the output signal of the one-channel repeater 22, 23, 24 or 25 should be the same as the output signal of the main transmitter 21 and the time delay of between the two signals should be small. In other words, the time delay of the on-channel repeaters 22 to 25 should be minimized.

Korean Patent Application No. 10-2003-32007 filed by the same assignee on May 20, 2003, which is incorporated herein by reference, discloses technology using the same on-channel repeaters 22 to 25 as shown in FIG. 3. In the prior art, the output signal of the on-channel repeater 22, 23, 24 or 25 is the same as the output signal of the main transmitter 21, and the time delay between the two signals is small. Also, the output signals of the on-channel repeaters 22 to 25 have superior characteristics to the input signals of the on-channel repeaters 22 to 25, because noise and multi-path signals generated in the transmission path between the main transmitter 21 and the on-channel repeaters 22 to 25 are removed. Moreover, the technology can also increase the transmission output power of the on-channel repeaters 22 to 25 by removing feedback signals generated by low isolation of the transmitting and receiving antenna of the on-channel repeaters 22 to 25.

Referring to FIG. 3, the on-channel repeaters 22 to 25 includes a radio frequency (RF) receiving portion 32, an intermediate frequency (IF) down-converting portion 33, a demodulating portion 34, an equalizing portion 35, a modulating portion 36, an RF up-converting portion 37, a high-power amplifying portion 38, a transmission antenna 39, and a local oscillating portion (LO) 40.

The RF receiving portion 32 receives an RF broadcasting signal transmitted from the main transmitter 21 through a receiving antenna 31 of a repeater. The IF down-converting portion 33 converts the RF broadcasting signal received in the RF receiving portion 32 into an IF signal based on a first reference frequency. The demodulating portion 34 converts the IF signal obtained in the IF down-converting portion 33 into a baseband signal.

The equalizing portion 35 removes noise and multi-path signals that are obtained in the demodulating portion 34 and generated between the main transmitter 21 and the on-channel repeaters 22 to 25. Also, the equalizing portion 35 removes feedback signals that are generated by low isolation of the transmitting and receiving antenna of the on-channel repeaters 22 to 25. The modulating portion 36 converts the baseband output signal of the equalizing portion 35 into an IF signal. The RF up-converting portion 37 converts the IF signal converted by the modulating portion 36 into an RF broadcasting signal based on a second reference frequency.

The high-power amplifying portion 38 amplifies the RF broadcasting signals obtained in the RF up-converting portion 37 and relays the amplified signals to the transmitting antenna. The transmission antenna 39 transmits a broadcasting signal outputted from the high-power amplifying portion 38.

The local oscillator (LO) 40 generates a first reference frequency in consideration that the demodulating portion 34 converts the IF signals into baseband signals to synchronize the frequencies and phases of transmitting and receiving signals, provides the first reference frequency to the IF down-converting portion 33, generates a second reference frequency based on the first reference frequency, and provides the second reference frequency to the RF up-converting portion 37.

Following is the operation of the on-channel repeaters 22 to 25. First, a receiving antenna 31 and an RF receiving portion 32 receive an RF broadcasting signal transmitted from the main transmitter 21. The received RF broadcasting signal is converted into an IF signal in an IF down-converting portion 33. Then, the IF signal is converted into a baseband signal in a demodulating portion 34.

The high-performance equalizing portion 35 removes noise and multi-path signals, which are caused by the transmission between the main transmitter 21 and the on-channel repeaters 22 to 25, and feedback signals generated due to low isolation of the transmission and receiving antennas 31 and 39.

The baseband signal which is free from the noise, multi-path signals and feedback signals is converted into the IF broadcasting signal in the modulating portion 36. The IF signal is converted into an RF signal in an RF up-converting portion, 37. The RF signal is amplified in a high-power amplifying portion 38 and then transmitted through the transmission antenna 39. The frequency and phase of the receiving signal should be synchronized with those of the transmitting signal.

The frequencies and phases of the signals in the transmitting portion and the receiving portion are synchronized as follows. To synchronize the frequencies of the transmitting and receiving signals in the RF frequency band with each other, only a reference frequency is provided to the IF down-converting unit and the RF up-converting unit. Then, the frequencies of the transmitting and receiving signals are synchronized with each other in the IF frequency band.

To synchronize the frequencies of the transmitting and receiving signals in the IF frequency band with each other, frequency and timing offset information abstracted from resynchronization process in the demodulating portion 34 are used in the modulating portion 36 without any change. This way, the output signal from the transmitting unit of the on-channel repeaters 22 to 25 is synchronized with the receiving signal in the frequency and phase. Therefore, the frequency and phase of the output signal of the on-channel repeaters 22 to 25 can be synchronized with those of the signal generated in the main transmitter 21 without using any additional reference signal.

As described above, if the signals transmitted from the main transmitter 21 and the on-channel repeaters 22 to 25 have time delay that goes out of the multi-path signal removal range of the equalization of the receiver, the equalization of the receiver fails to remove the delayed signals.

For this reason, the time delay between the output signals from the on-channel repeaters 22 to 25 and the output signal from the main transmitter 21 should be minimized in order to provide the digital broadcasting service through the on-channel repeaters 22 to 25. However, the use of the conventional modulating portion 36 of FIG. 4 in the on-channel repeaters 22 to 25 makes the time delay long.

Referring to FIG. 4, the conventional modulating portion 36 includes a baseband signal forming unit 41, a pilot insertion unit 42, a up-sampling unit 43, a vestigial sideband (VSB) filtering unit 44, an IF up-converting unit 45, an adder 46, a digital-to-analogue converting (DAC) unit 47. The VSB filtering unit 44 includes an In-phase (I) filter 441 and a quadrature (Q) filter 442.

The baseband signal forming unit 41 forms a baseband signal by combining the output signals of the equalizing portion 35 with the predefined field/segment synchronization signals. The pilot insertion unit 42 inserts a pilot signal to the baseband signal.

Subsequently, the baseband signal with the pilot signal is up-sampled in the up-sampling unit 43, and the up-sampled signal is converted into an I signal and a Q signal after VSB-filtering in the VSB filtering unit 44. The VSB filtering unit 44 includes the I filter $g(n)*\{g(n)\cdot\cos(2\pi\cdot f_{VSB}\cdot nT)\}$ 441 and the Q filter $g(n)*\{g(n)\cdot\sin(2\pi\cdot f_{VSB}\cdot nT)\}$ 442. Here, the frequency $f_{VSB}$ is 2.69 MHz and * denotes a convolution operation.

An I signal and a Q signal that are obtained after VSB-filtering are converted into IF signals by the IF up-converting unit 45 to obtain an IF up-converted I signal and an IF up-converted Q signal.

The IF up-converting unit 45 includes a first up-converting unit 451 for the I signal to which $\cos(2\pi\cdot f_{IF}\cdot nT)$ is multiplied and a second up-converting unit 452 for the Q signal to which $\sin(2\pi\cdot f_{IF}\cdot nT)$ is multiplied. Here, the frequency $f_{IF}$ up-converts the frequency of a VSB-filtered signal into a frequency of the IF band.

Finally, the IF up-converted I and Q signals are converted into digital VSB signals of the IF band by the adder unit 46. The digital VSB signals of the IF band are converted into analogue IF signals in the digital-to-analogue converting unit 47.

The conventional modulating portion 36 includes one time delay unit, i.e., the VSB filtering unit 44 for VSB modulation. Here, the time delay of the VSB filtering unit 44 is determined by the number of filter taps used therein. In other words, when it is assumed that the number of the taps of the I filter 441 is N and the number of the taps of the Q filter 442 is M, N/2 and M/2 time delay are generated in the I filter 441 and the Q filter 442, respectively.

However, since the I filter 441 and the Q filter 442 use the same Square Root Raised Cosine (SRRC) filter, the number of taps used in the two filters 441 and 442 is the same. Also, because the I filter 441 and the Q filter 442 have a parallel structure to each other the total delay time is generated as much as the taps, i.e., N/2 or M/2, in the VSB filtering unit 44.

Generally, a signal generated by the VSB filter should satisfy a spectrum standard, which is called Spectrum Mask. However, the aforementioned VSB filtering unit 44 which is generated using the SRRC filter is known to satisfy the Spectrum Mask standard when the up-sampling rate is 4 and the number of taps used in the SRRC filter is more than 500.

The VSB modulation unit 500 using an SRRC filter with more than 500 taps can be used in the main transmitter 21 in which relatively long time delay is allowed, but it is inappropriate for the on-channel repeaters 22 to 25 that require short time delay. Therefore, in order to provide a digital broadcasting service through the on-channel repeaters 22 to 25, a modulation method that can minimize the time delay of the on-channel repeaters 22 to 25 is required. That is, the time delay between the output signal of the main transmitter 21 and the output signals of the on-channel repeaters 22 to 25 should be small.

SUMMARY OF THE INVENTION

It is, therefore, an object of the present invention to provide a modulating portion that can reduce time delay caused by a filter used for modulating on-channel repeaters in a terrestrial digital television (TV) broadcasting system.

In accordance with an aspect of the present invention, there is provided a modulating portion for reducing time delay of an on-channel repeater in a terrestrial digital television broadcasting system, including: a baseband signal forming unit for forming a baseband signal by combining the output signals of an equalization unit in the on-channel repeaters with the pre-defined field/segment synchronization signals; a pilot inserting unit for inserting a pilot signal to the baseband signal; an up-sampling unit for up-sampling the baseband signal with the pilot signal; a VSB filtering unit for filtering the up-sampled baseband signal based on a Window technique and/or an Equi-Ripple filter to thereby form an in-phase (I) signal and a quadrature (Q) signal; an up-converting unit for up-converting the frequencies of the filtered I and Q signals to frequencies of an intermediate frequency (IF) band; an adding unit for adding the up-converted I and Q signals and converting a resultant signal into a digital VSB signal of the IF band; and a digital-to-analogue converting unit for converting the digital signal of the IF band to an analogue signal.

In the present invention, on-channel repeaters having low system delay and outputting signals with excellent characteristics are used to relay digital broadcasting signals. When such on-channel repeaters are used, existing receivers are less affected due to the relatively low system delay. The excellent characteristics of the output signals from the on-channel repeaters can expand the relay area.

Therefore, the technology of the present invention reduces the time delay of the on-channel repeaters in the digital TV broadcasting system in the following method. First, an output signal of an equalizing portion that is used in an on-channel repeater is formed during modulation, that is, a baseband signal is formed by combining the output signals of an equalization unit with the pre-defined field/segment synchronization signals. Then, a pilot signal is inserted to the baseband signal, and the baseband signal with the pilot signal is up-sampled. The up-sampled signal is converted to a vestigial sideband (VSB)-filtered I signal and a VSB-filtered Q signal through a new VSB filtering unit which includes an Equi-Ripple (ER) filter and a Window technique. Subsequently, the VSB-filtered I and Q signals are up-converted to IF signals, and then the IF up-converted I and Q signals are added up and the resultant signal is converted to a VSB signal of the IF band. The digital VSB signal of the IF band is converted to an analogue IF signal in a digital-to-analogue converting unit 47.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 5:
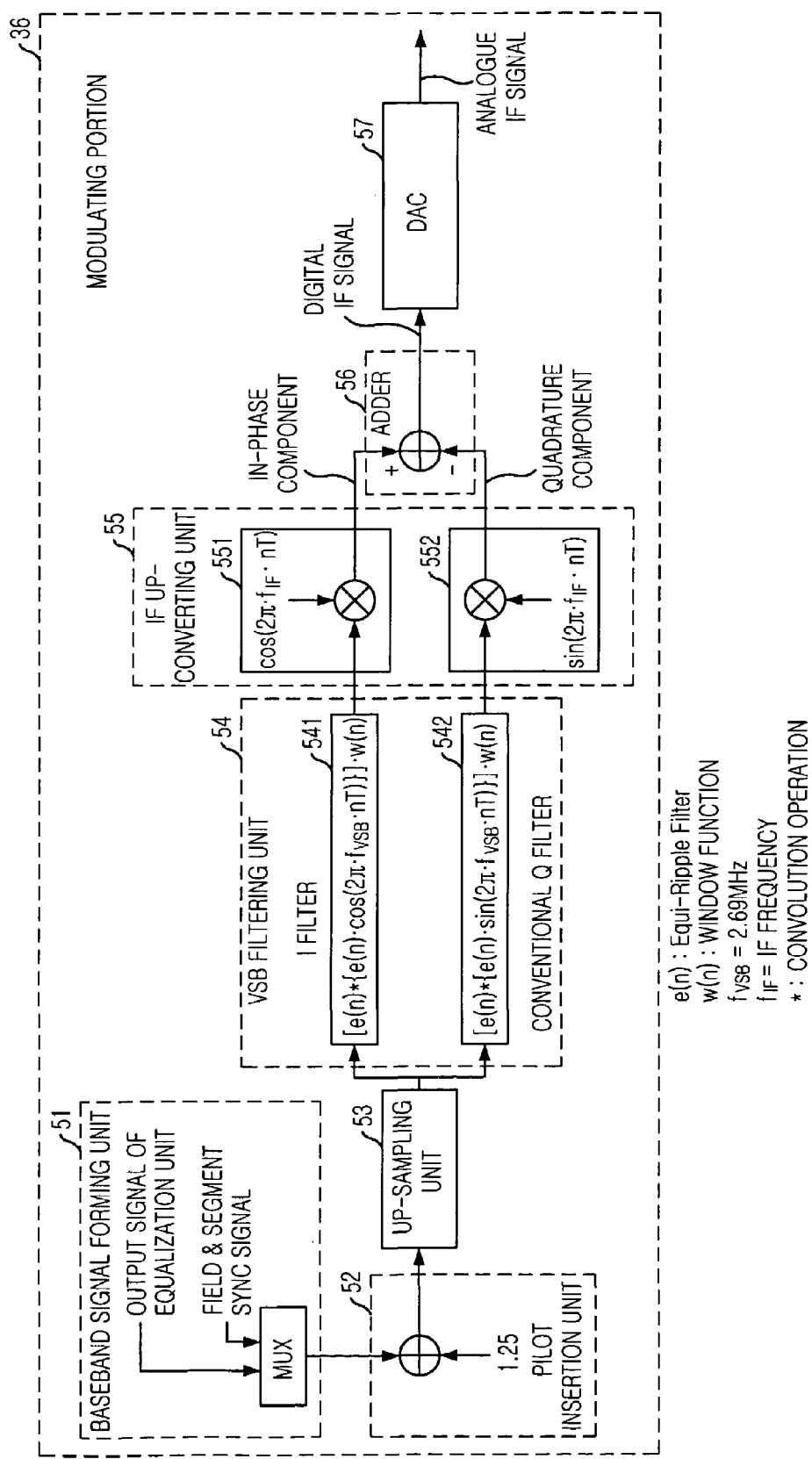
FIG. 5 is a block diagram illustrating a modulating portion for reducing time delay of an OCR in accordance with an embodiment of the present invention.

FIG. 5 is a block diagram illustrating a modulating portion for reducing time delay of an on-channel repeater (OCR) in accordance with an embodiment of the present invention. Referring to FIG. 5, the modulating portion for reducing time delay of OCR includes a baseband signal forming unit 51, a pilot insertion unit 52, an up-sampling unit 53, a vestigial sideband (VSB) filtering unit 54, an IF up-converting unit 55, an adder 56, and a digital-to-analogue converting unit 57.

The baseband signal forming unit 51 forms a baseband signal by combining the output signals of an equalizing portion 35 which are used in on-channel repeaters 22 to 25 with the pre-defined field/segment synchronization signals. The pilot insertion unit 52 inserts a pilot signal to the baseband signal.

The up-sampling unit 53 up-samples the baseband signal with the pilot signal. The VSB filtering unit 54 generating an in-phase (I) signal and a quadrature (Q) signal by filtering the up-sampled baseband signal based on a Window method and/or an Equi-Ripple filter.

The IF up-converting unit 55 up-converts the frequencies of the filtered I and Q signals into frequencies of the IF band. The adder 56 adds the up-converted I and Q signals and converts the resultant signal into a digital signal of the IF band. Then, the digital-to-analogue converting unit 57 converts the digital signal of the IF band to an analogue signal.

The VSB filtering unit 54 includes an I filter 541 and a Q filter 542 and performs VSB filtering using the Window technique and an ER filter, instead of using only a Square Root Raised Cosine (SRRC) filter.

Meanwhile, the VSB filtering unit 54 can perform VSB filtering using an SRRC filter and the Window technique, instead of using only the SRRC filter. Also, the VSB filtering unit 54 can perform VSB filtering using the ER filter only, instead of using only the SRRC filter.

The modulating portion having the above-described structure is operated as follows. First, in the baseband signal forming unit 51, a baseband signal is formed by combining the output signals of an equalizing portion 35 which are used in on-channel repeaters 22 to 25 with the pre-defined field/segment synchronization signals. Then, a pilot signal is inserted to the baseband signal in the pilot insertion unit 52.

The baseband signal with the pilot signal is up-sampled in the up-sampling unit 53, and the up-sampled signal is converted into a VSB-filtered I signal and a VSB-filtered Q signal in the VSB filtering unit 54 using a Window technique and an ER(e(n)) filter.

The VSB filtering unit 54 includes the I filter ([e(n)*{e(n)·cos($2\pi \cdot f_{VSB} \cdot nT$)}]·w(n)) 541 and the Q filter ([e(n)*{e(n)·cos($2\pi \cdot f_{VSB} \cdot nT$)}]·w(n)) 542. Here, the frequency $f_{VSB}$ is 2.69 MHz and * denotes a convolution operation. Also, w(n) denotes a Window function. The w(n) may be one of various Window functions, such as Kaiser, Hamming, Hanning and Blackman.

Subsequently, the VSB-filtered I and Q signals are converted into IF signals, i.e., IF up-converted I and Q signals in the IF up-converting unit 55. The IF up-converting unit 55 includes an I signal up-converter 551 to which cos($2\pi \cdot f_{IF} \cdot nT$) is multiplied and a Q signal up-converter 552 to which $\sin(2\pi \cdot f_{IF} \cdot nT)$ is multiplied. Here, the frequency $f_{IF}$ up-converts the frequency of the VSB filtered signals to a frequency of the IF band.

Finally, the IF up-converted I and Q signals are converted to a digital VSB signal of the IF band by the adder 56, and the digital VSB signal of the IF band is converted to an analogue IF signal in the digital-to-analogue converting unit (DAC) 57.

Figure 1:
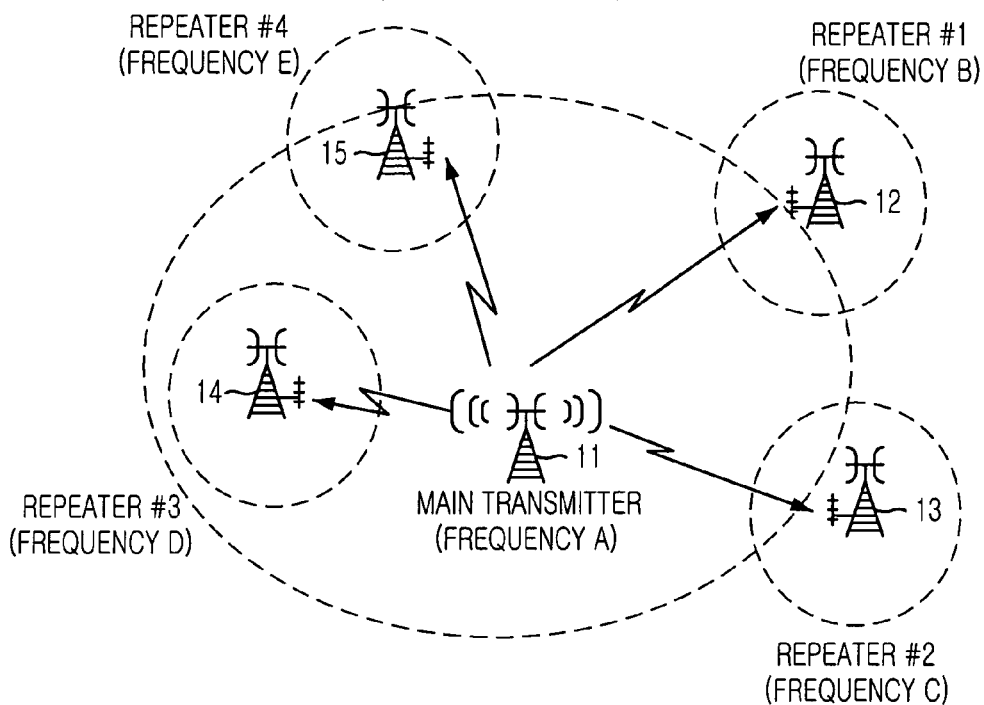
FIG. 1 is a diagram showing a concept of broadcasting service using conventional repeaters.
Figure 2:
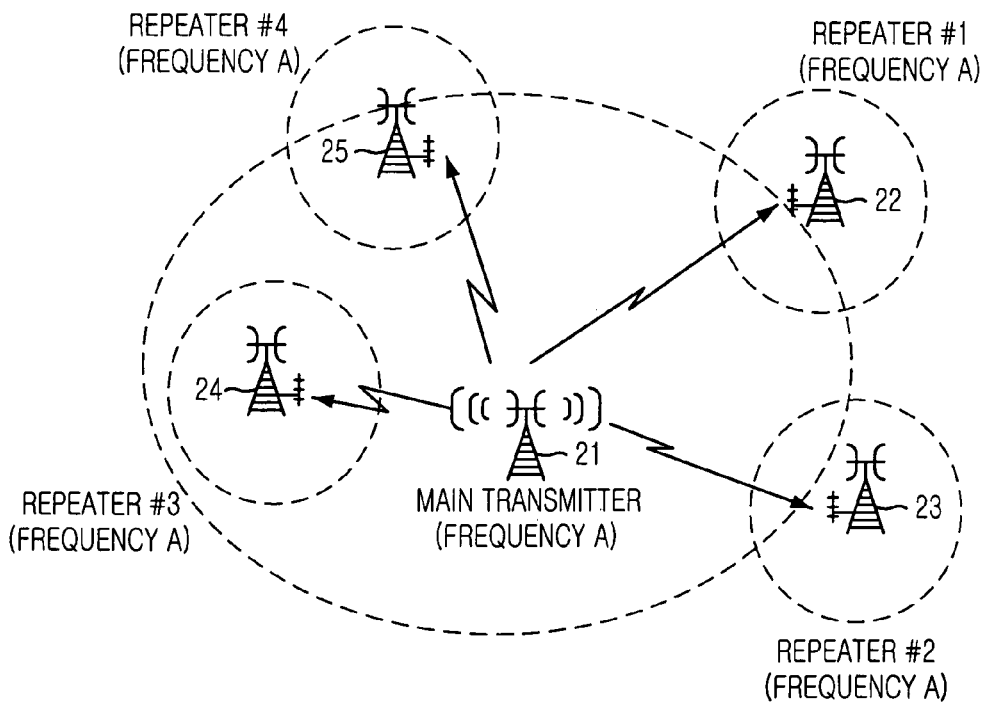
FIG. 2 is a diagram illustrating a concept of broadcasting service using common on-channel repeaters (OCR)
Figure 3:
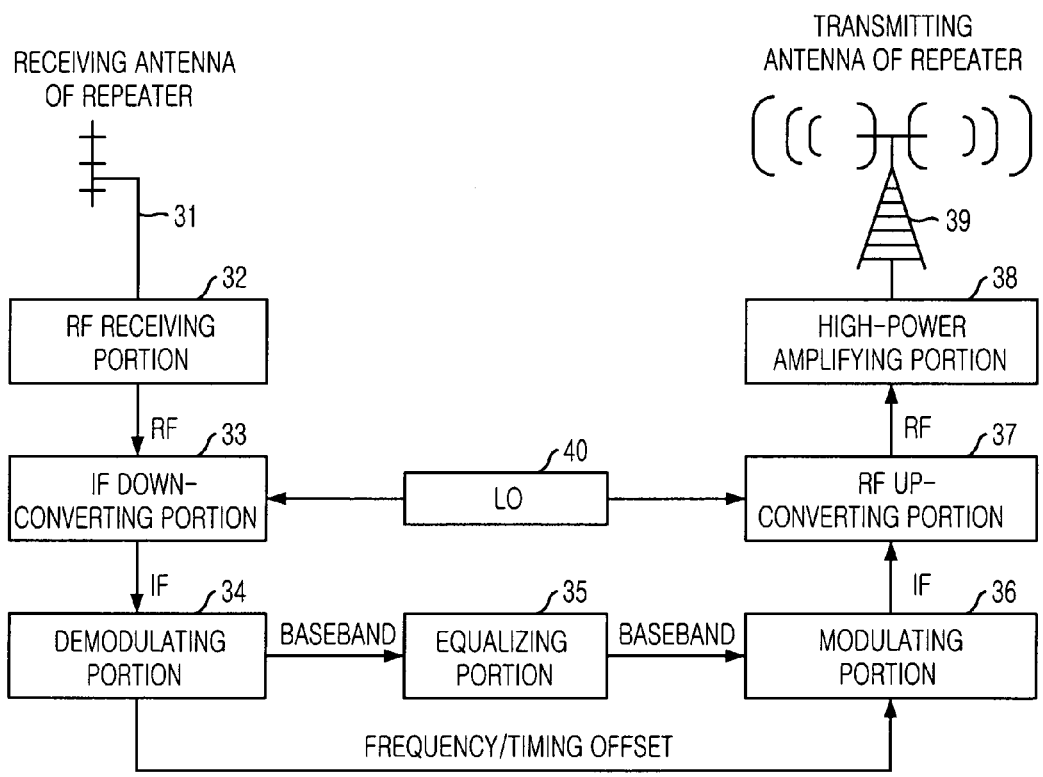
FIG. 3 is a block diagram describing an OCR of FIG. 2 according to an embodiment of prior art.
Figure 4:
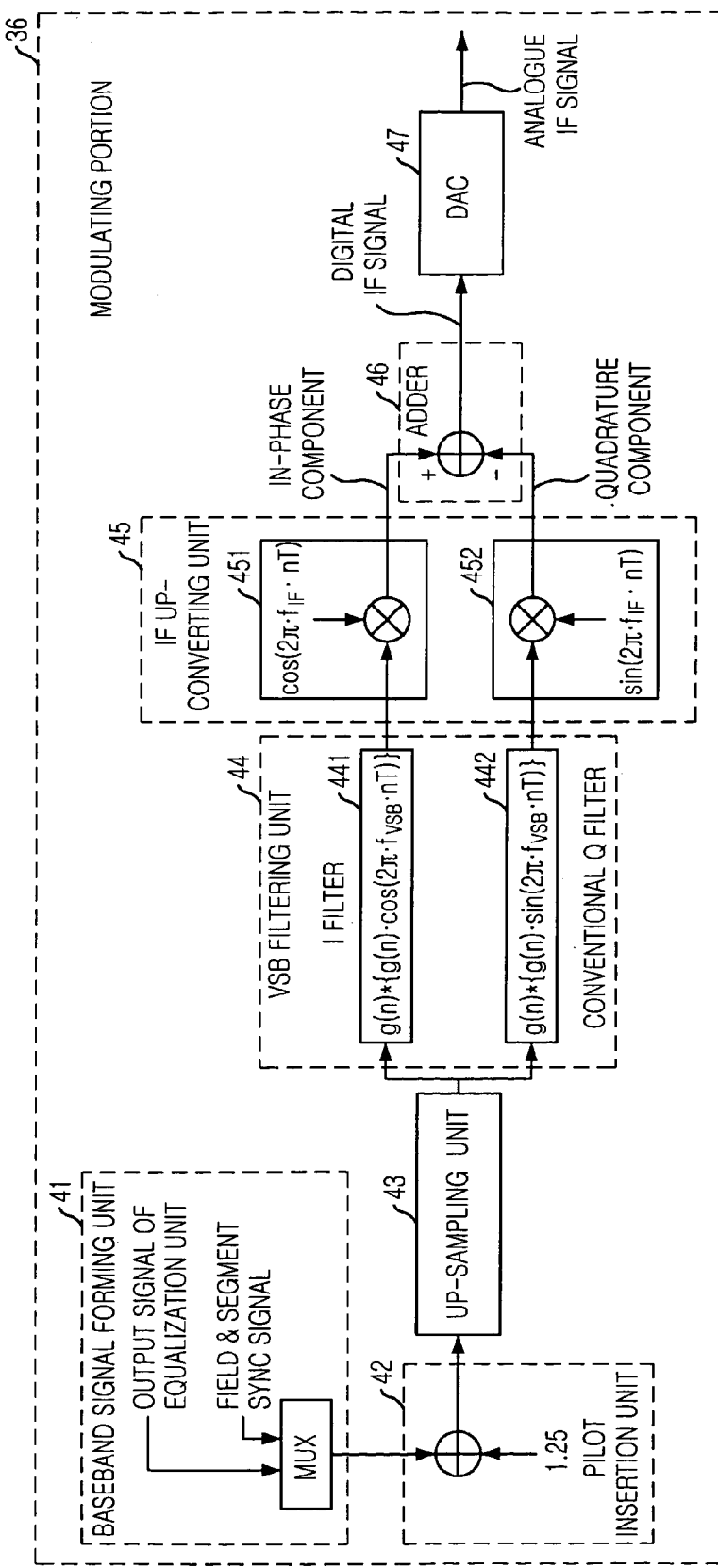
FIG. 4 is a block diagram showing a conventional modulating portion used in an OCR.

As described above, the modulating portion (see FIG. 5) of the present invention includes one time delay device, i.e., the VSB filtering unit 54, just as the conventional modulating portion of FIG. 4, and the time delay of the VSB filtering unit 54 is determined by the number of filter taps used therein.

If the number of taps of the I filter 441 and 541 is K and the number of taps of the Q filter 442 and 542 is L, time delay of K/2 and L/2 are generated in the I filter 441 and the Q filter 442, respectively. However, since the I filter 441 and the Q filter 442 use the same SRRC filter, the number of taps of the two filters 441 and 442 are the same. Also, since the I filter 441 and the Q filter 442 have a parallel structure with each other, the entire time delay generated in the VSB filtering unit 44 is K/2 or L/2.

On the contrary, since the VSB filtering unit 54 of the modulating portion of the present invention uses an ER filter and a Window technique, it can satisfy Spectrum Mask standards with relatively small number of taps of the ER filter.

For example, when the up-sampling ratio of the conventional VSB filtering unit 44 is 4, an SRRC filter having more than 500 taps should be used to fulfill the Spectrum Mask standards. However, with the VSB filtering unit 54, the Spectrum Mask standards can be satisfied by using an ER filter having more than 100 taps.

Therefore, with the modulating portion of the above-mentioned structure, it is possible to manufacture on-channel repeaters 22 to 25 having small time delay between the output signals of the main transmitter 21 and the output signals of the on-channel repeaters 22 to 25.

The modulating portion and method of the present invention yields relatively low system delay in the on-channel repeaters. By using such on-channel repeaters, the relay area can be expanded and the limited frequency resources can be used efficiently.

While the present invention has been described with respect to certain preferred embodiments, it will be apparent to those skilled in the art that various changes and modifications may be made without departing from the scope of the invention as defined in the following claims.

What is claimed is:

1. A modulation apparatus, comprising:
   a baseband signal forming means for forming a baseband signal by combining the output signals of an equalization unit with pre-defined field/segment synchronization signals in a plurality of on-channel repeaters;
   a pilot inserting means for inserting a pilot signal to the baseband signal;
   an up-sampling means for up-sampling the baseband signal with the pilot signal;
   a vestigial sideband (VSB) filtering means for filtering the up-sampled baseband signal based on a Window technique and an Equi-Ripple filter to form an in-phase (I) signal and a quadrature (Q) signal;
   an up-converting means for up-converting the frequencies of the filtered I and Q signals to frequencies of an intermediate frequency (IF) band;
   an adding means for adding the up-converted I and Q signals and converting a resultant signal into a digital VSB signal of the IF band; and
   a digital-to-analogue converting means for converting the digital signal of the IF band to an analogue signal,
   wherein the modulation apparatus operates to reduce time delay of each of the plurality of on-channel repeaters in a terrestrial digital television broadcasting system.

* * * * *